United States Patent
Kawabata et al.

(10) Patent No.: US 8,285,479 B2
(45) Date of Patent: Oct. 9, 2012

(54) PARKING ASSIST APPARATUS

(75) Inventors: Yukiko Kawabata, Toyota (JP); Yasushi Makino, Mishima (JP); Hideyuki Iwakiri, Tajimi (JP); Yuichi Kubota, Okazaki (JP); Tomohiko Endo, Toyota (JP); Miyuki Omori, Toyota (JP); Takuya Ito, Kuwana (JP); Daisuke Suzuki, Toyota (JP); Takashi Nitta, Yahata (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 504 days.

(21) Appl. No.: 12/526,680

(22) PCT Filed: Feb. 27, 2008

(86) PCT No.: PCT/JP2008/053395
§ 371 (c)(1),
(2), (4) Date: Aug. 11, 2009

(87) PCT Pub. No.: WO2008/108243
PCT Pub. Date: Sep. 12, 2008

(65) Prior Publication Data
US 2010/0114434 A1 May 6, 2010

(30) Foreign Application Priority Data
Mar. 8, 2007 (JP) ................... 2007-059060

(51) Int. Cl.
*G06F 17/10* (2006.01)
(52) U.S. Cl. ........... 701/301; 701/41; 340/436; 180/204
(58) Field of Classification Search ............... 701/301, 701/211, 41; 340/436, 438; 180/204
See application file for complete search history.

(56) References Cited

U.S. PATENT DOCUMENTS
6,154,695 A * 11/2000 Shimizu et al. ............... 701/41
(Continued)

FOREIGN PATENT DOCUMENTS
JP 10 264840 10/1998
(Continued)

OTHER PUBLICATIONS

Satonaka, H. et al., "Development of Parking Space Detection Using an Ultrasonic Sensor", 13th World Congress & Exhibition on Intelligent Transport Systems and Services, Technical/Scientific Sessions, pp. 1-8, (2006).

(Continued)

*Primary Examiner* — Mark Hellner
(74) *Attorney, Agent, or Firm* — Oblon, Spivak, McClelland, Maier & Neustadt, L.L.P.

(57) ABSTRACT

A parking assist apparatus for guiding a vehicle to a target parking position includes an initial position guiding unit configured to generate an initial position guiding path at a predetermined timing, the initial position guiding path leading from a current position of the vehicle to an initial position where vehicle guidance to the target parking position is started. The initial position guiding unit is also configured to guide the vehicle along the initial position guiding path to the initial position. The apparatus also includes an obstacle detecting unit configured to detect an obstacle around the vehicle. When the obstacle detected by the obstacle detecting unit is located along the initial position guiding path, the initial position guiding unit generates the initial position guiding path such that the obstacle detected by the obstacle detecting unit can be avoided.

7 Claims, 12 Drawing Sheets

U.S. PATENT DOCUMENTS

| | | | |
|---|---|---|---|
| 7,640,108 B2 * | 12/2009 | Shimizu et al. | 701/301 |
| 2002/0005779 A1 | 1/2002 | Ishii et al. | |
| 2002/0175832 A1 * | 11/2002 | Mizusawa et al. | 340/932.2 |
| 2008/0177443 A1 * | 7/2008 | Lee et al. | 701/41 |
| 2009/0091475 A1 | 4/2009 | Watanabe et al. | |
| 2011/0063131 A1 * | 3/2011 | Toledo et al. | 340/932.2 |

FOREIGN PATENT DOCUMENTS

| | | |
|---|---|---|
| JP | 2000 335436 | 12/2000 |
| JP | 2001 347909 | 12/2001 |
| JP | 2003 81041 | 3/2003 |
| JP | 2004 99015 | 4/2004 |
| JP | 2004 306814 | 11/2004 |
| JP | 2005 35498 | 2/2005 |
| JP | 2006 193011 | 7/2006 |
| JP | 2006 248383 | 9/2006 |
| JP | 2006 312440 | 11/2006 |
| JP | 2006 347460 | 12/2006 |
| JP | 2007 26926 | 2/2007 |
| JP | 2008 195357 | 8/2008 |

OTHER PUBLICATIONS

Endo, T. et al., "Development of Reverse Parking Assist With Automatic Steering", $10^{th}$ World Congress & Exihibition on Intellegent Transport Systems and Services, pp. 1-9, (2003).

Endo, T. et al., "Development of Steering Assist System for Parking to Reduce Driver's Load", (Symposium of the Transportation and Logistics Division of the Japan Society of Mechanical Engineers), pp. 28-31, (2003).

Iwazaki K. et al., "Intelligent Algorithm for Generating a Vehicle Guidance Route in an Automatic Steering Type Parking Assist System", FISITA 2004 World Automotive Congress, pp. 40-54, (2004).

Kawabata, Y. et al., "Improvement of Reverse Parking Assist With Automatic Steering", Toyota Motor Corporation, Aisin Seiki Co., Ltd., Electronics Development Div. 2, Toyota Motor Corporation, pp. 1-11, (2008).

U.S. Appl. No. 12/293,559, filed Sep. 19, 2008, Kawabata, et al.
U.S. Appl. No. 12/298,037, filed Oct. 22, 2008, Kawabat A, et al.

* cited by examiner

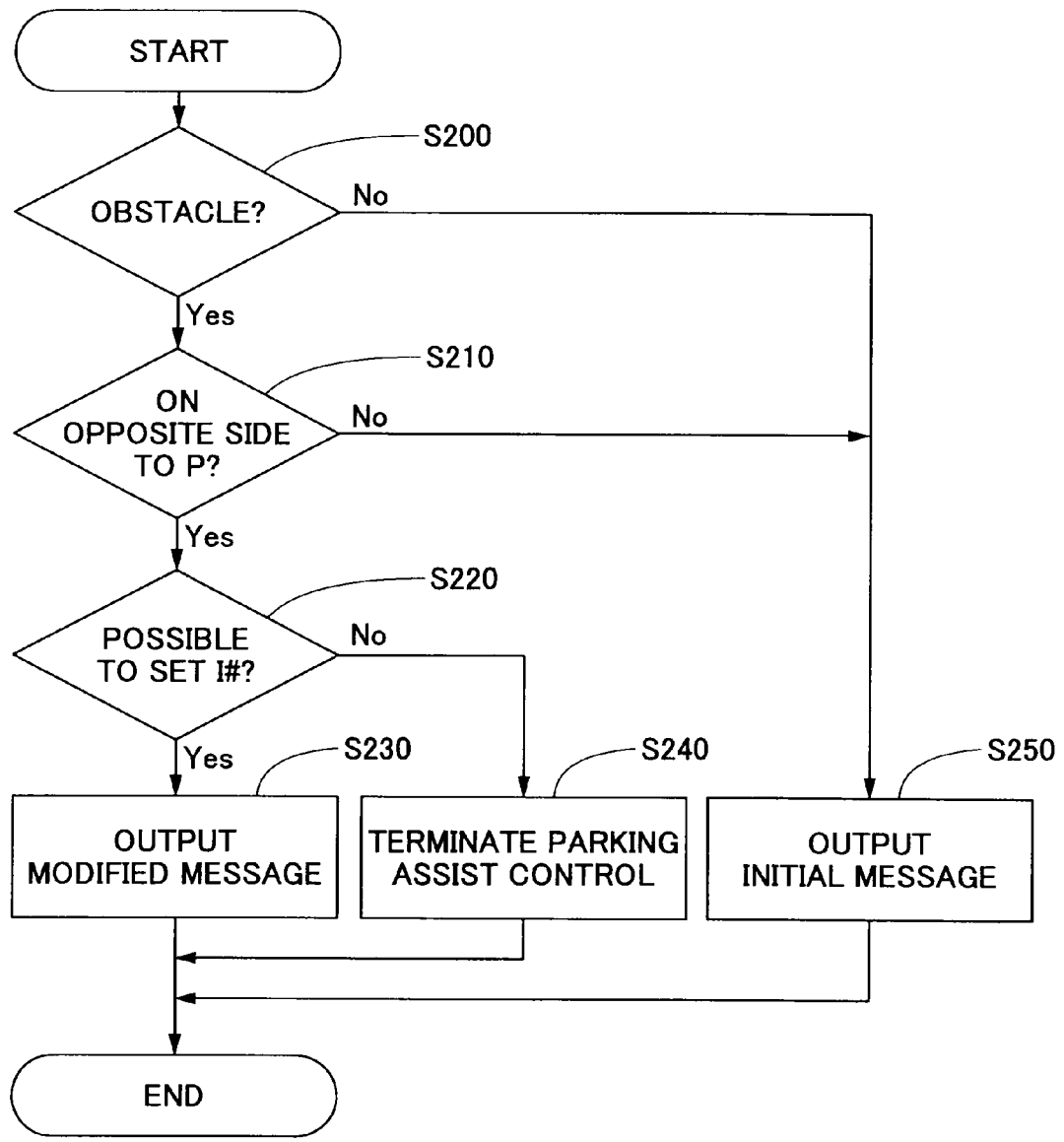

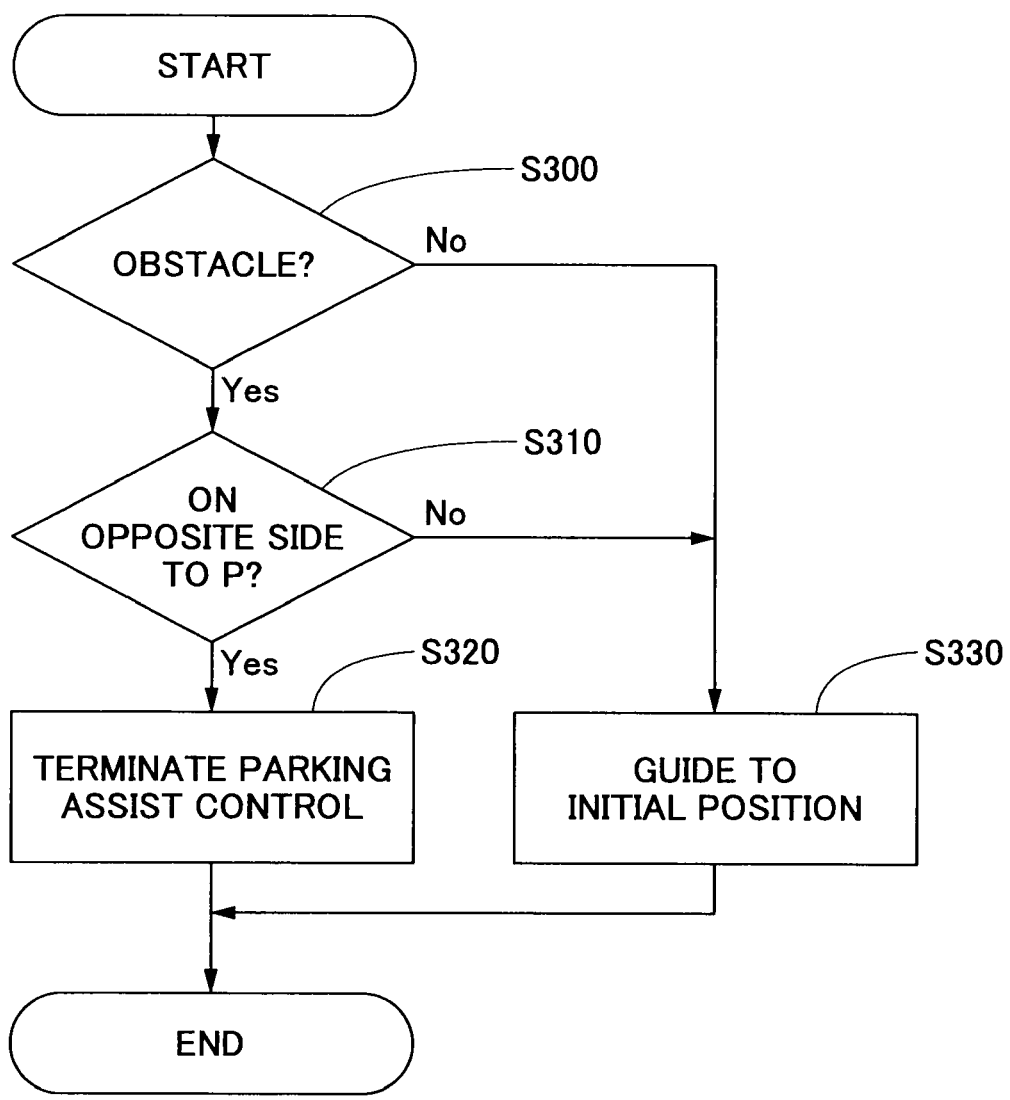

PARKING ASSIST APPARATUS

TECHNICAL FIELD

The present invention relates to a parking assist apparatus for guiding a vehicle to a target parking position.

BACKGROUND ART

A control system, which may be referred to as an intelligent parking assist, is known in which a steering force (and driving force) that is outputted by an electric power steering unit or the like is controlled to guide a vehicle equipped with the control system to a target parking position. The target parking position is set on an operating screen where an image obtained by a camera installed to view the rear of the vehicle is displayed (see Non-Patent Document 1, for example).

In such a control system, in order to avoid complicating the control, normally an initial position is set from which the vehicle can be guided to the target parking position smoothly (i.e., without repeatedly moving the steering wheel and the vehicle back and forth, while minimizing the angle of movement of the steering wheel when the vehicle is not moving). Such guidance of the vehicle to the initial position may involve a voice or visual guidance, automatic steering control, or automatic travel control.

In an apparatus for guiding a vehicle to an initial position by automatic steering control (see Patent Document 1, for example), an automatic steering control is effected so that, after a vehicle is moved near a targeted parking space, the vehicle can be guided to a travel direction switching position (which corresponds to the aforementioned initial position).

Patent Document 1: Japanese Laid-Open Patent Application No. 2000-335436

Non-Patent Document 1: New model car manual for Prius (No. 7108100), Chapter 5, "Electrical", pp. 120-133, Servicing Department of Toyota Motor Corporation, Sep. 1, 2003

DISCLOSURE OF THE INVENTION

Problems to be Solved by the Invention

However, in the above conventional apparatus, no consideration is given to the possible presence of an obstacle along the path between the vicinity of the target parking position and the initial position. Thus, the vehicle may hit the obstacle or, less seriously, the driver may feel nervous until the vehicle reaches the initial position.

It is therefore an object of the present invention to overcome this problem and to provide a parking assist apparatus capable of appropriately guiding a vehicle to an initial position where vehicle guidance to a target parking position is started, while considering the possible presence of obstacles.

Means for Solving the Problem

According to a first embodiment of the present invention, a parking assist apparatus for guiding a vehicle to a target parking position includes an initial position guiding unit configured to generate an initial position guiding path at a predetermined timing, the initial position guiding path leading from a current position of the vehicle to an initial position where vehicle guidance to the target parking position is started. The initial position guiding unit is also configured to guide the vehicle along the initial position guiding path to the initial position. The apparatus also includes an obstacle detecting unit configured to detect an obstacle around the vehicle. When the obstacle detected by the obstacle detecting unit is located along the initial position guiding path, the initial position guiding unit generates the initial position guiding path such that the obstacle detected by the obstacle detecting unit can be avoided.

According to this embodiment, the vehicle is guided to the initial position along the initial position guiding path that avoids the obstacle, whereby the vehicle can avoid hitting the obstacle. Thus, the vehicle can be appropriately guided to the initial position where vehicle guidance to the target parking position is started while considering the presence of the obstacle.

According to a second embodiment of the present invention, a parking assist apparatus for guiding a vehicle to a target parking position includes an initial position guiding unit configured to guide at a predetermined timing the vehicle to an initial position where vehicle guidance to the target parking position is started; and an obstacle detecting unit configured to detect an obstacle around the vehicle. The initial position guiding unit guides the vehicle to the initial position differently depending on whether the obstacle detected by the obstacle detecting unit is located on an opposite side to the target parking position with respect to a direction of travel of the vehicle.

According to the second embodiment, when the obstacle is detected on the opposite side to the target parking position with respect to the vehicle travel direction, the initial position guiding unit guide the vehicle to the initial position with a smaller steering angle than when the obstacle is not detected on the opposite side to the target parking position with respect to the vehicle travel direction.

Preferably, when the obstacle is detected on the opposite side to the target parking position with respect to the vehicle travel direction, the initial position guiding unit may determine whether the vehicle can travel to the initial position without hitting the obstacle. If it is determined that the vehicle will be able to reach the initial position without hitting the obstacle, the initial position guiding unit guides the vehicle to the initial position.

According to a third embodiment of the present invention, a parking assist apparatus for guiding a vehicle to a target parking position includes an initial position guiding unit configured to guide the vehicle at a predetermined timing to an initial position where vehicle guidance to the target parking position is started; and an obstacle detecting unit configured to detect an obstacle around the vehicle. The initial position guiding unit guides the vehicle to the initial position when the obstacle detected by the obstacle detecting unit is not located on an opposite side to the target parking position with respect to a direction of travel of the vehicle.

Effects of the Invention

According to the present invention, a parking assist apparatus is provided that is capable of appropriately guiding a vehicle to an initial position where vehicle guidance to a target parking position is started, while considering the presence of an obstacle.

BRIEF DESCRIPTION OF THE DRAWINGS

FIG. 8 shows a flowchart of an initial position guidance process performed by the parking assist ECU 70 according to a second embodiment; and FIG. 9 shows a flowchart of an initial position guidance process performed by the parking assist ECU 70 according to a third embodiment.

Figure 1:
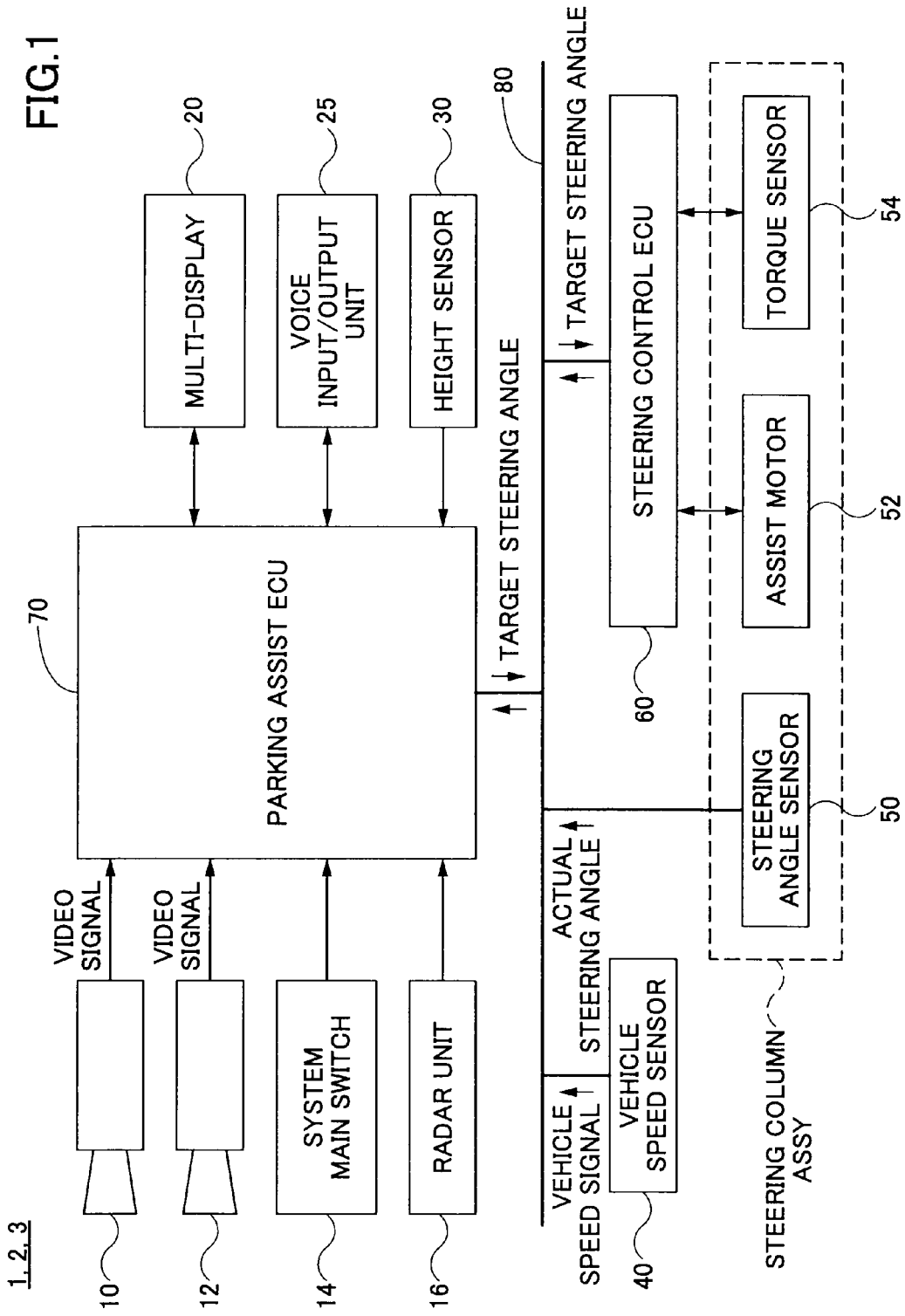
FIG. 1 shows an overall structure of a parking assist apparatus 1.

DESCRIPTION OF THE REFERENCE NUMERALS 1, 2, 3 parking assist apparatus
10 front camera
12 rear camera
14 system main switch
16 radar unit
20 multi-display
25 voice input/output unit
30 height sensor
40 vehicle speed sensor
50 steering angle sensor
52 assist motor
54 torque sensor
60 steering control ECU
70 parking assist ECU
80 multiplex communication line

DETAILED DESCRIPTION OF THE PREFERRED EMBODIMENTS

In the following, preferred embodiments of the present invention are described with reference to the attached drawings.

First Embodiment

[Outline]

Hereafter, a parking assist apparatus 1 according to a first embodiment of the present invention is described. The parking assist apparatus 1 is mainly used for automatically outputting a steering force for guiding a vehicle in a backward movement to a target parking position that is set in an image obtained by a front camera 10 or a rear camera 12. In a preliminary stage of such vehicle guidance to the target parking position, the parking assist apparatus 1 guides the vehicle at a predetermined timing to an initial position in a forward movement, where vehicle guidance to the target parking position is started. These controls may be hereafter collectively referred to as a "parking assist control", where the aforementioned backward and forward movements of the vehicle may be reversed.

[Configuration]

FIG. 1 shows an overall configuration of the parking assist apparatus 1. The parking assist apparatus 1 includes a front camera 10; a rear camera 12; a system main switch 14; a radar unit 16; a multi-display 20; a voice input/output unit 25; a height sensor 30; a vehicle speed sensor 40; and a steering column assembly ("ASSY") which includes a steering angle sensor 50, an assist motor 52, and a torque sensor 54 within. The parking assist apparatus 1 also includes a steering control ECU (Electronic Control Unit) 60 and a parking assist ECU 70. The vehicle speed sensor 40 and the other components with the subsequent reference numerals are connected to a multiplex communication line 80 so that they can refer to one another's input and output information. The communications between the devices via the multiplex communication line 80 may be based on an appropriate communication protocol, such as CAN (Controller Area Network), BEAN, AVC-LAN, or FlexRay.

The front camera 10 may include a CCD camera or a CMOS imaging device disposed at the top center of the window shield, for taking an image of the front of the vehicle. The rear camera 12 may be installed on the bumper or around the license plate at the rear of the vehicle, and may include a wide-angle lens and a CCD or CMOS imaging device. The rear camera 12 has an optical axis that is inclined downward towards the rear of the vehicle so that an image of the rear of the vehicle can be taken. The images taken by the front camera 10 and the rear camera 12 are transmitted to the parking assist ECU 70 as video signals.

The system main switch 14 is disposed at a certain position within the car where a user has access and is used to enter an instruction for starting the parking assist control. The system main switch 14 is normally off and is turned on by a user operation. A status signal of the system main switch 14 is transmitted to the parking assist ECU 70.

The radar unit 16 may include a millimeter wave radar unit. The radar unit 16 transmits a radar wave toward the front of the vehicle via an opening formed in the front bumper, for example, in order to detect an obstacle that may exist in an area extending in front and to the sides of the vehicle. In order to ensure the detection area, preferably a pair of such millimeter wave radar units are installed at both left and right sides of the vehicle. The radar unit 16 may also include a laser radar, a ultrasonic radar, or a stereo camera. A result of detection by the radar unit 16 is transmitted to the parking assist ECU 70.

The multi-display 20 may display various images including moving images by using a VGA (Video Graphics Array) graphics system. The multi-display 20 includes a touch panel for allowing a user to enter various input operations (such as for entering a target location for path guidance). The multi-display 20 detects a change in voltage on its surface caused by a touch operation by the user, thus recognizing a touched position. Such input operation made on the multi-display 20 is then transmitted to the parking assist ECU 70, where a displayed content on the multi-display 20 is determined. The multi-display 20 may be shared with a vehicle-mounted navigation apparatus.

The voice input/output unit 25 may include a speaker or a microphone for voice input and output, or a buzzer. A voice input made on the voice input/output unit 25 is transmitted to the parking assist ECU 70, which then determines an output content for the voice input/output unit 25.

The height sensor 30 is attached to the suspension device for each of the wheels, and is configured to detect the extent of contraction or expansion of the suspension device. An output of the height sensor 30 is transmitted to the parking assist ECU 70.

The vehicle speed sensor 40 may include a wheel speed sensor attached to each of the wheels and a skid control computer. The skid control computer may convert a wheel speed pulse signal outputted by the wheel speed sensor into a vehicle-speed rectangular-wave pulse signal (vehicle speed signal) which is outputted onto the multiplex communication line 80.

The steering angle sensor 50 detects a steering angle (actual steering angle) of the vehicle and transmits it via the multiplex communication line 80 as a steering angle signal. The assist motor 52 outputs a torque required for steering the vehicle in order to assist the driver's steering operation. The torque outputted by the assist motor 52 is transmitted to a column shaft with the direction of torque transmission changed and rotation speed reduced by a worm gear and a wheel gear, so that eventually the direction of the wheels can be changed. The torque sensor 54 detects a torsion in a torsion bar attached between an input shaft and an output shaft, and transmits a signal corresponding to a steering torque to the steering control ECU 60.

The steering control ECU 60 may include a computer unit in which a CPU is connected to a ROM and a RAM via a bus. The steering control ECU 60 may further include a recording medium such as an HDD (Hard Disc Drive) or a DVD (Digital Versatile Disk), an I/O port, a timer, and a counter. The ROM may store programs executed by the CPU and data. Normally, i.e., when not effecting the parking assist control, the steering control ECU 60 outputs a control signal to a drive circuit for the assist motor 52 based on the steering torque signal from the torque sensor 54 and other vehicle condition signals (such as vehicle speed and yaw rate signals), so that the assist motor 52 outputs a required torque for steering the vehicle. When effecting the parking assist control, the steering control ECU 60 controls the assist motor 52 based on an instruction signal from the parking assist ECU 70, in addition to (or instead of) the aforementioned assist motor control for normal time.

The parking assist ECU 70 may include a computer unit having the same hardware configuration as that of the steering control ECU 60. The parking assist ECU 70 starts the parking assist control upon operation of the system main switch 14, as described below.

[Initial Setting of Target Parking Position]

Figure 2:
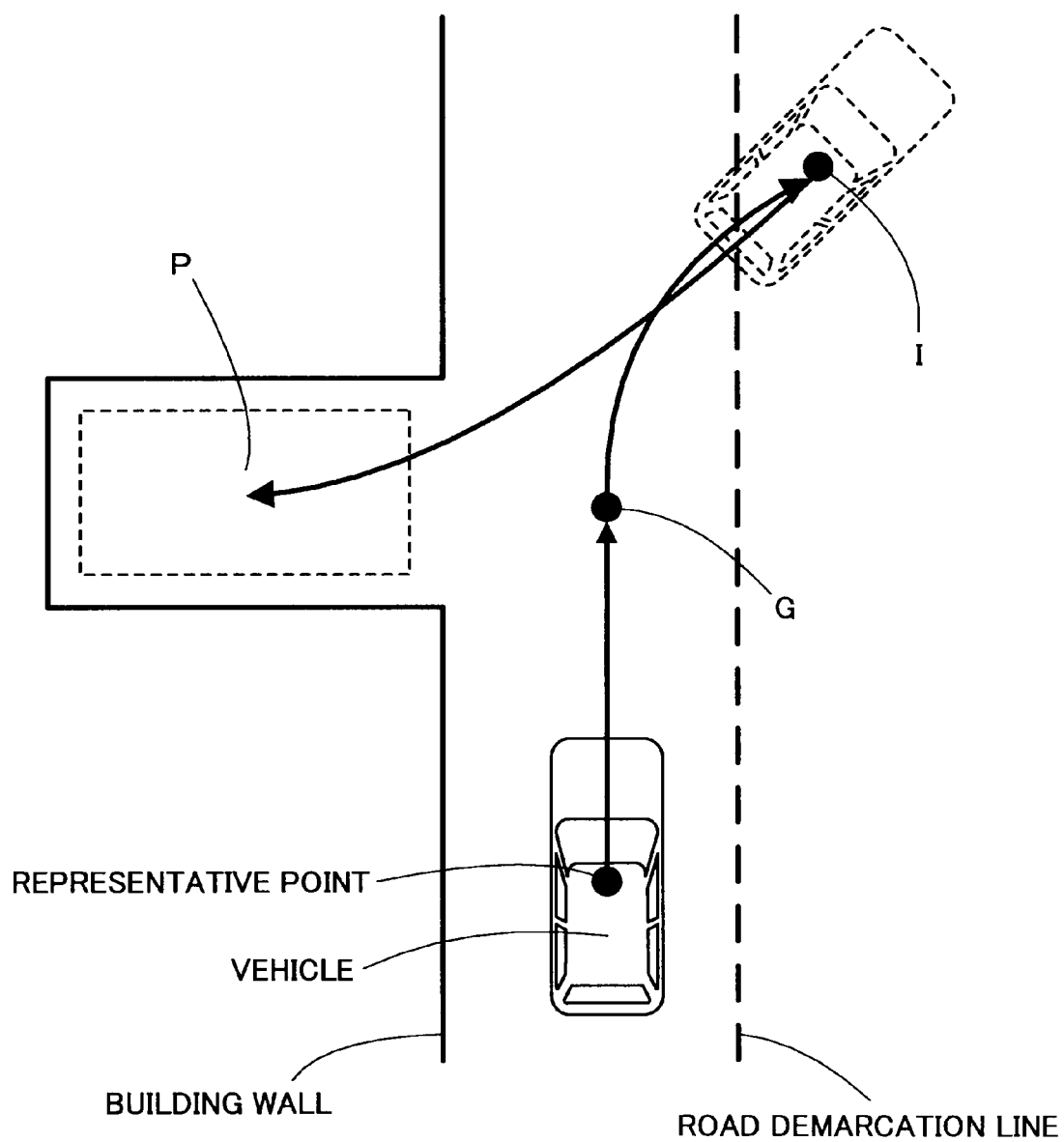
FIG. 2 shows a typical situation where parking assist control is started.

FIG. 2 shows a typical situation in which the parking assist control is initiated. In the figure, P designates a target parking position, I designates an initial position, G designates a point from which guidance to the initial position is started, and the arrows indicate trajectories of a representative point (such as the center of gravity) of the vehicle during the parking assist control.

Figure 3:
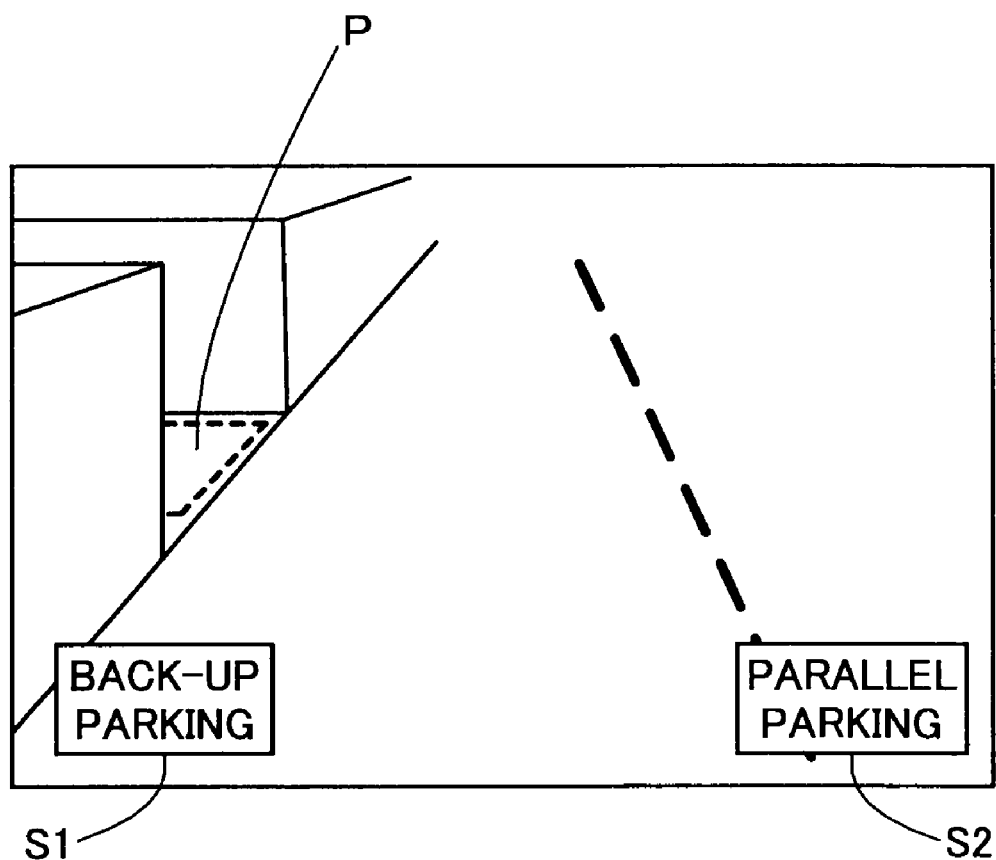
FIG. 3 shows an image obtained by a front camera 10 in the situation of FIG. 2.

Upon operation of the system main switch 14, the parking assist ECU 70 displays an image obtained by the front camera 10 on the multi-display 20. FIG. 3 shows an example of the image from the front camera 10 (on the multi-display 20) in the situation of FIG. 2.

The target parking position P is initially set by, for example, a user designating a parking slot in the display screen on the multi-display 20, via touch panel operation. The position thus set in the display screen of the multi-display 20, which is an image coordinate system position, is mapped onto a position in a two-dimensional coordinate system (as shown in FIG. 2) based on the installation parameters of the front camera 10 (such as roll, pan, pitch, installed height (which may include a vehicle height measured by the height sensor 30), and focal distance). The display screen of the multi-display 20 also shows switches S1 and S2 for switching between a backup parking mode and a parallel parking mode.

Although FIGS. 2 and 3 show a situation for the backup parking mode, there is no substantial difference between these modes as regards the practical application of the present invention. Thus, the following descriptions are based on the assumption of the backup parking mode, while omitting the description of the parallel parking mode. The manner of initial setting of the target parking position P is not limited to the above example. In other embodiments, the target parking position P may be set by recognizing a parking reference line drawn on the road by image analysis, or by recognizing a parking space using a radar unit.

[Guidance to Initial Position]

Once the target parking position is initially set, the vehicle moves forward and reaches a point G near the target parking position P when guidance to the initial position I is started.

Figure 4A:
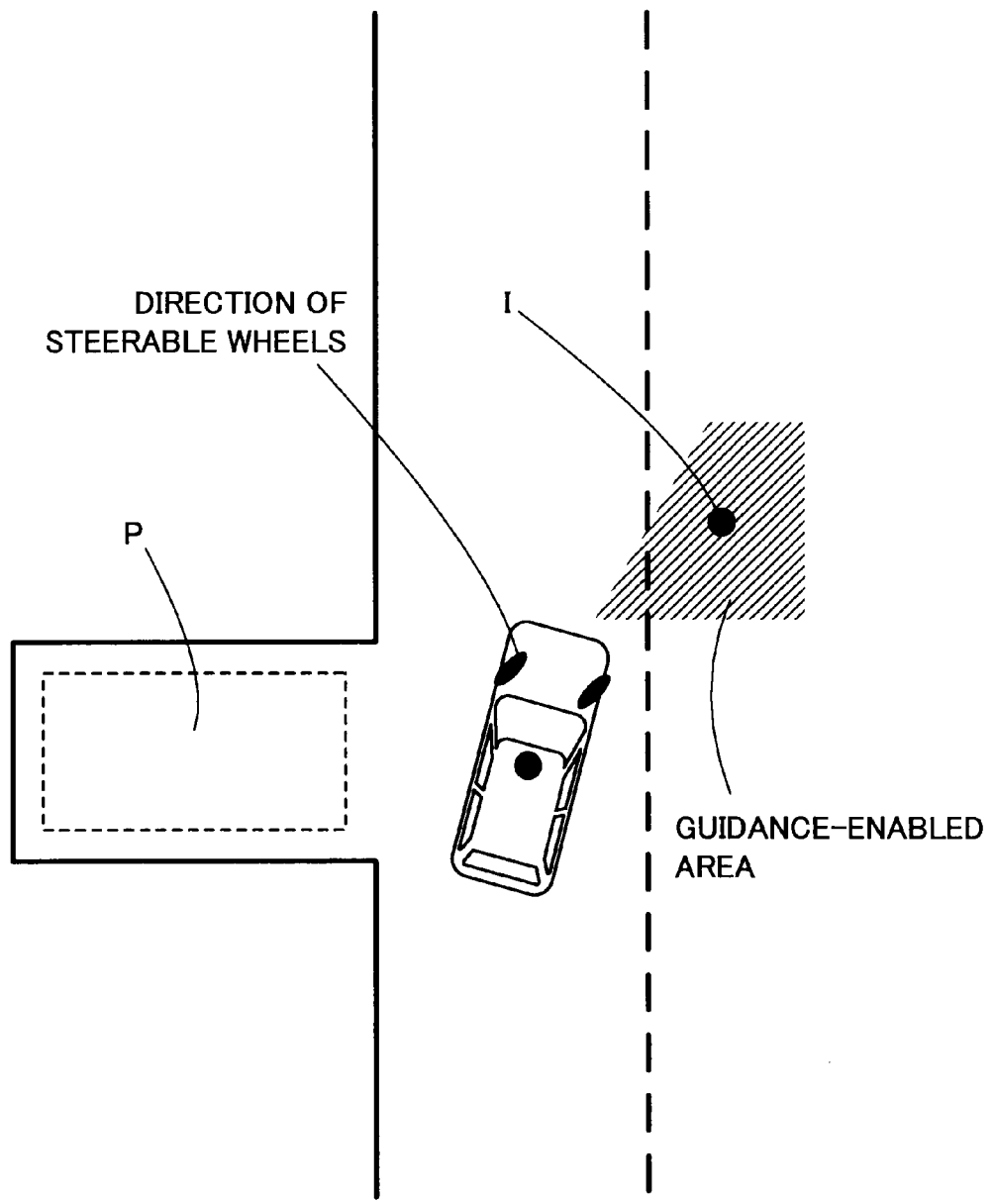
FIG. 4A shows how a guidance enabled area is derived.
Figure 4B:
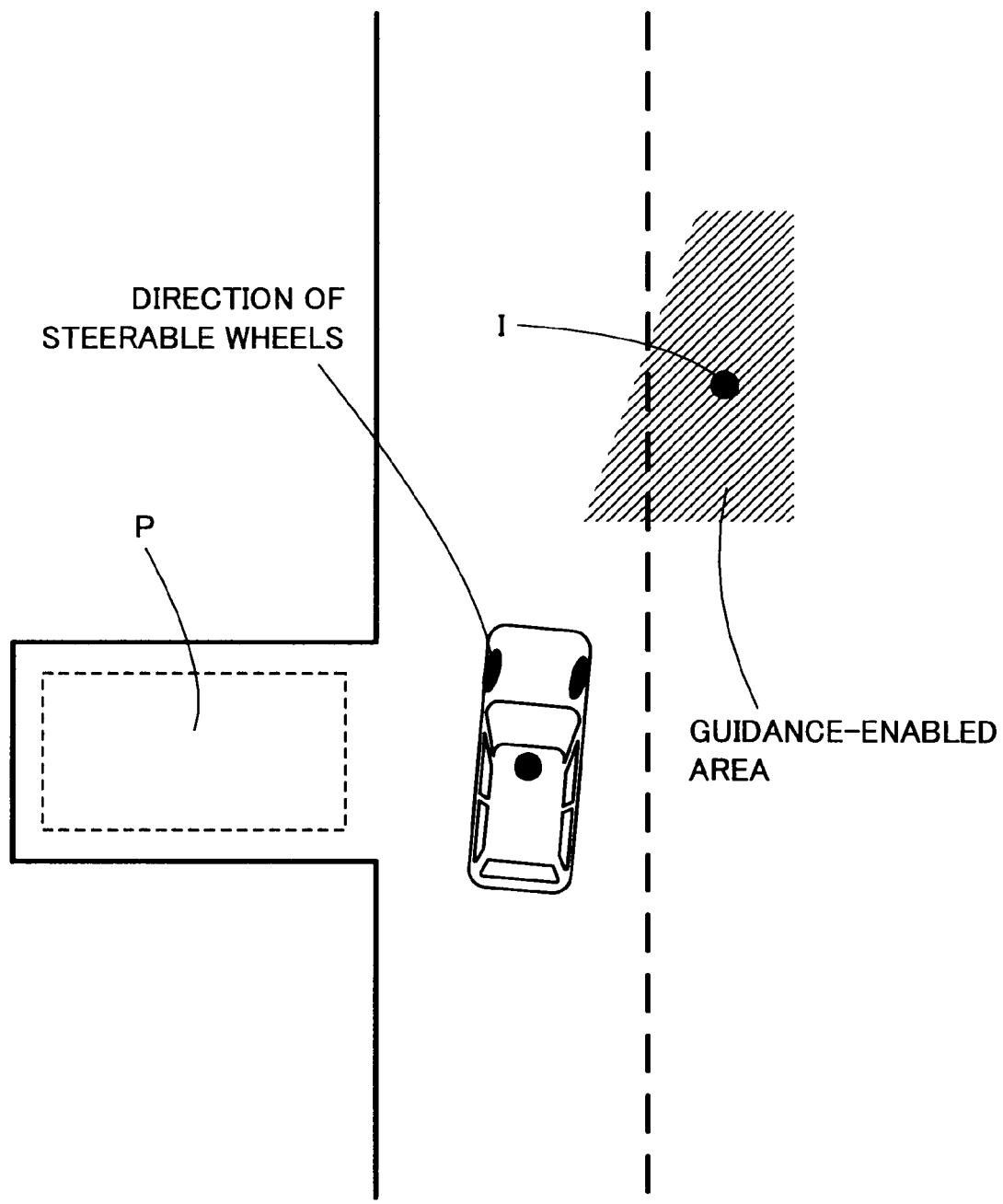
FIG. 4B shows how a guidance enabled area is derived.

The initial position I refers to, for example, a position appropriately selected within a guidance enabled area where the vehicle can be guided to the target parking position P without the repeated back-and-forth movements of the steering wheel and the vehicle while minimizing the angle of turning of the steering wheel when the vehicle is not moving. Specifically, the guidance enabled area is derived based on the positional relationship between the target parking position P and the vehicle (such as their relative positions and inclination angles), and the vehicle steering angle ascertained by the steering angle sensor 50 (see FIGS. 4A and 4B). Then, the initial position I is set at an appropriate position within the guidance enabled area.

Once the initial position I is determined, a path from the current position G of the vehicle to the initial position I is generated, basically by using a combination of straight lines, clothoid curves, and arcs. Then, a target steering angle is derived based on the curvature at individual points along the path, and then outputted onto the multiplex communication line 80. In the steering control ECU 60, a steering torque for the assist motor 52 is determined based on the target steering angle. In this way, the vehicle can travel to the initial position in a gentle curve without the assist motor 52 outputting more steering torque than is necessary. The forward driving force required for such movement may be provided by an engine creep torque by instructing the driver to put his or her foot off the accelerator pedal. A desired driving force may also be outputted by controlling the engine or other drive units such as a motor.

However, an obstacle may exist along the path between the vehicle current position G and the initial position I. In such a case, the above-described basic control may result in the vehicle hitting the obstacle or, less seriously, the driver feeling nervous.

Figure 5:
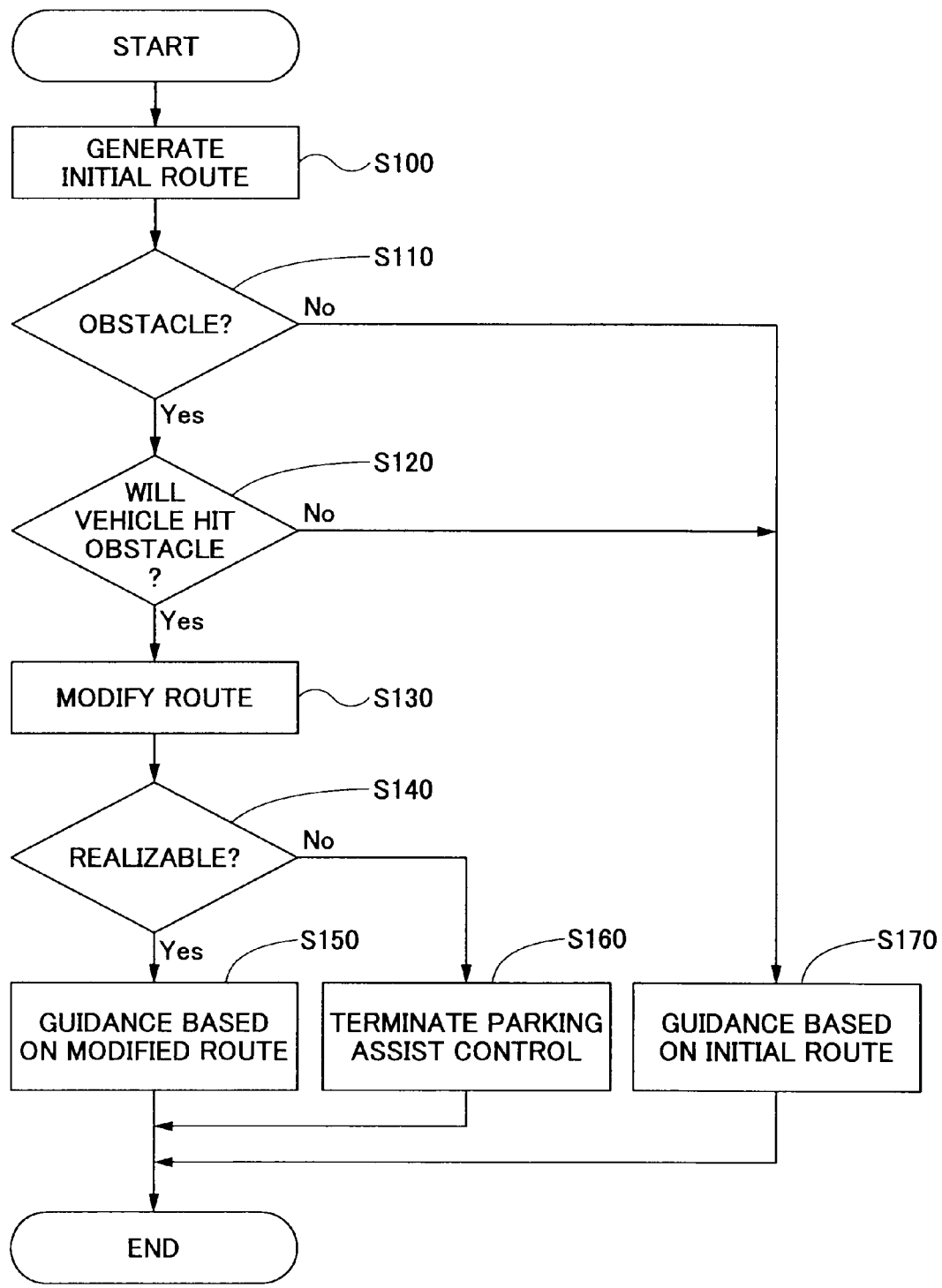
FIG. 5 shows a flowchart of an initial position guidance process performed by a parking assist ECU 70 according to a first embodiment.

Thus, in accordance with the present embodiment, a path from the vehicle current position G to the initial position I is generated such that the vehicle will not hit any obstacle that may be detected by the radar unit 16. FIG. 5 shows a flowchart of an initial position guiding process performed by the parking assist ECU 70 according to the present embodiment. This process is started upon initially setting the target parking position P, as described above.

First, the parking assist ECU 70 generates an initial path on the assumption of no obstacle (S100). In the next step, it is determined whether an obstacle is detected by the radar unit 16 (S110).

If no obstacle is detected by the radar unit 16, the parking assist ECU 70 outputs a target steering angle in accordance with an existing point of the vehicle onto the multiplex communication line 80 so that the vehicle can travel to the initial position I along the initial path (S170).

If an obstacle is detected by the radar unit 16, it is determined whether the vehicle will hit the obstacle, on the assumption that the vehicle traveled along the initial path to the initial position I (S120).

If it is determined that the vehicle will not hit the obstacle, the parking assist ECU 70 outputs a target steering angle in accordance with an existing point of the vehicle onto the multiplex communication line 80 so that the vehicle can travel to the initial position I along the initial path (S170).

Figure 6A:
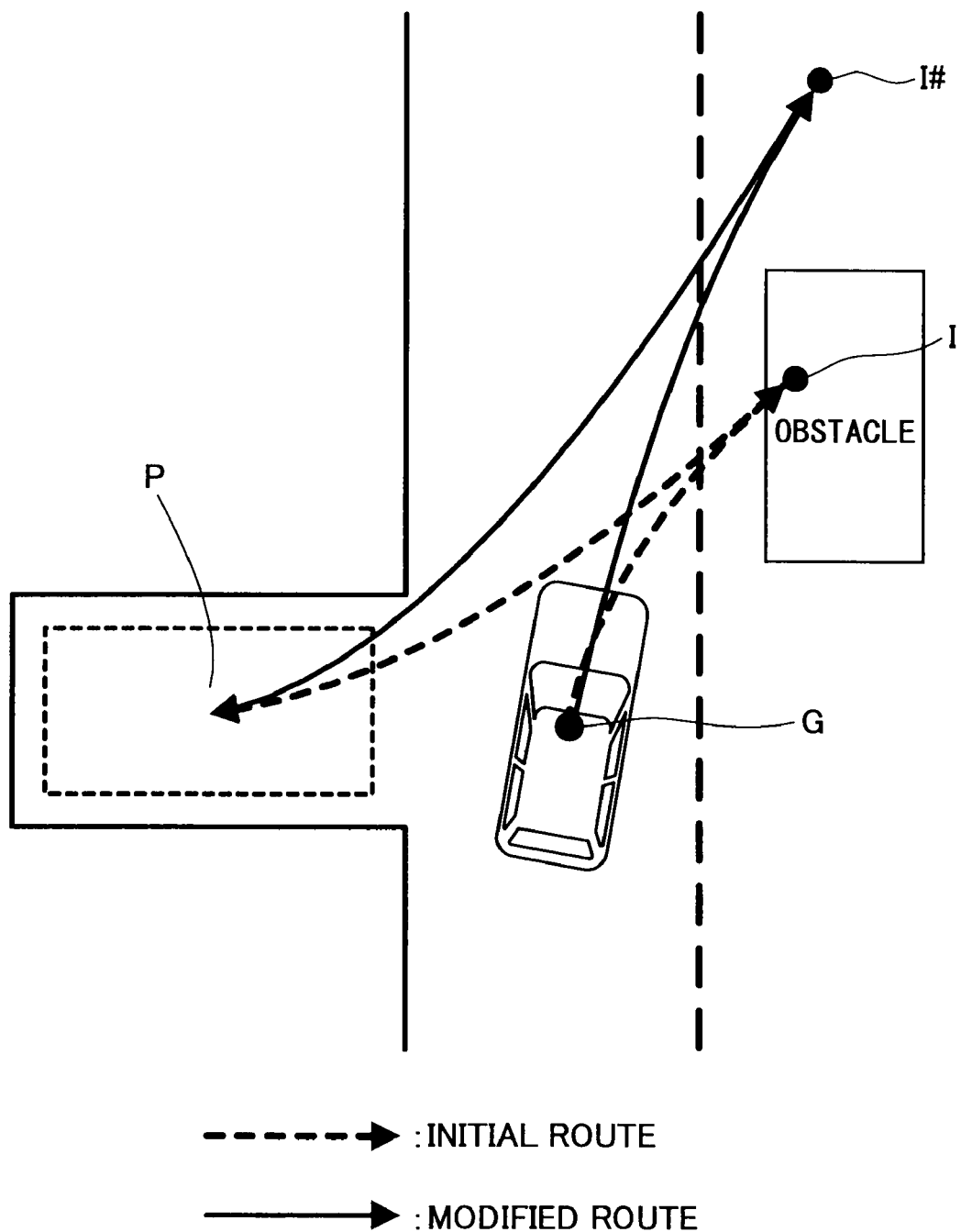
FIG. 6A illustrates a process of generating a path from a current position of a vehicle to an initial position so that the vehicle will not hit an obstacle.
Figure 6B:
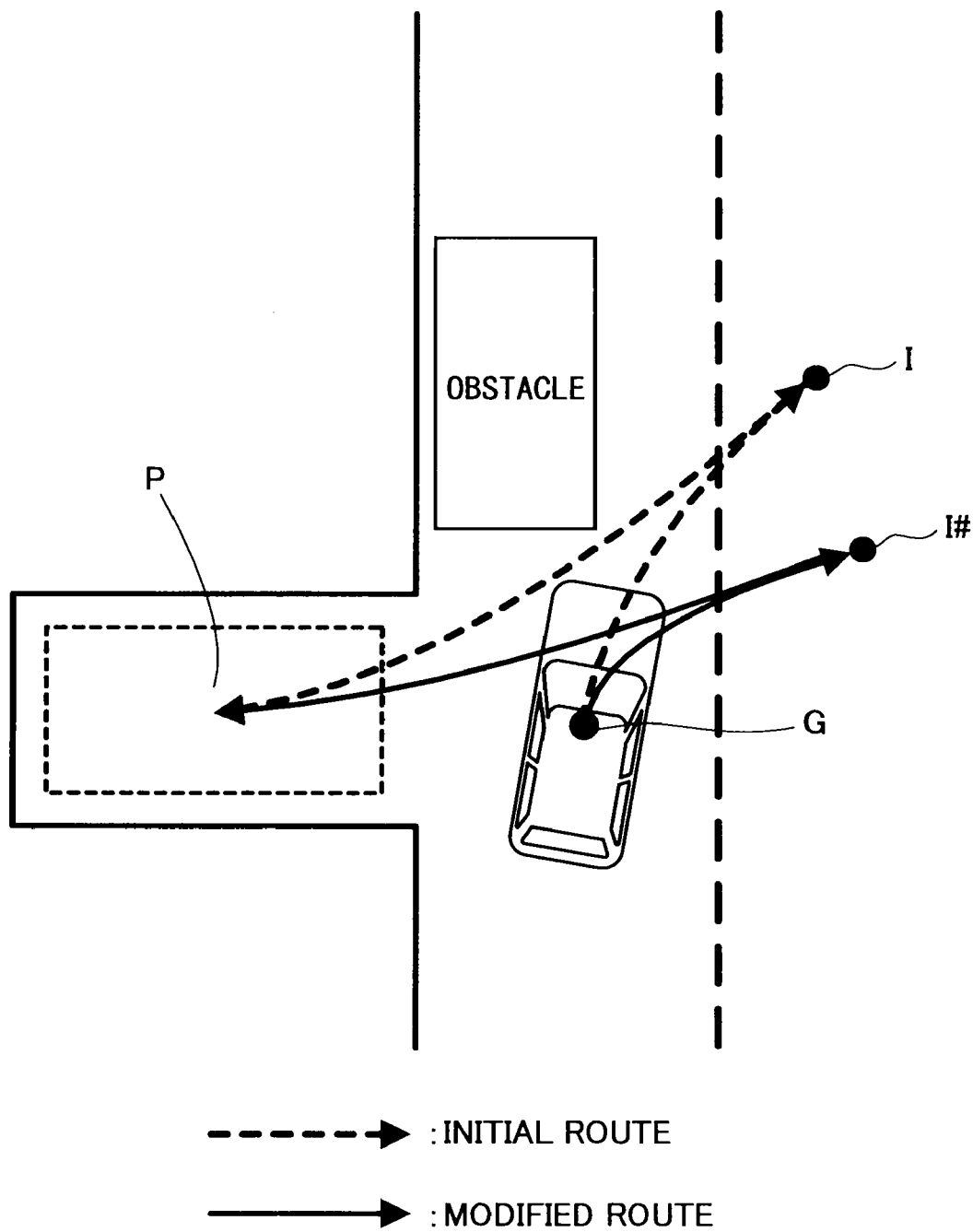
FIG. 6B illustrates a process of generating a path from a current position of a vehicle to an initial position so that the vehicle will not hit an obstacle.

On the other hand, if it is determined that the vehicle will not hit the obstacle, the initial path is modified so that the vehicle can travel from its current position G to an initial position I# without hitting the obstacle (S130; see FIGS. 6A and 6B). The initial position I# according to the modified path is set within the aforementioned guidance enabled area.

It is then determined whether the modified path can be realized (S140). Specifically, for example, when the curvature at each point along the modified path exceeds a limit curvature which may be derived from the wheelbase or the limit steering angle of the vehicle, the modified path is determined to be unrealizable. It should be noted that one prerequisite of the guiding process according to the present embodiment is that the guidance to the initial position I# should not require complicated vehicle movements including the repeated back-and-forth movements of the steering wheel and the vehicle.

When the modified path is realizable, the parking assist ECU 70 outputs a target steering angle in accordance with an existing point of the vehicle onto the multiplex communication line 80 so that the vehicle can move to the initial position I# along the modified path (S150) while avoiding the obstacle (see FIG. 6). Thus, when there is an obstacle along the path to the initial position I that is initially set, the probability of carrying through the parking assist control can be increased.

When the modified path is unrealizable, guidance to the initial position I# is not possible. Thus, the driver is notified of termination of the parking assist control via the voice input/output unit 25, for example (S160).

Thus, the vehicle can be guided to the initial position appropriately while taking into consideration an obstacle that may exist along the path between the current position of the vehicle and the initial position.

While the guidance is provided by automatic steering control in the foregoing embodiment, such guidance may be realized via a voice guidance by the voice input/output unit 25 or a display on the multi-display 20. Namely, an operation of the steering wheel may be indicated via a voice instruction, or a path from the vehicle current position to the initial position may be superposed on an image from the front camera 10 on the multi-display 20.

[Guidance to Target Parking Position]

Once the Vehicle has moved to the initial position, the parking assist ECU 70 switches the display content on the multi-display 20 to an image obtained by the rear camera 12. Thereafter, a target parking position P is established in the display screen on the multi-display 20 in the same manner as used in initially setting the target parking position P. Then, the parking assist ECU 70 generates a path from the initial position I to the target parking position P, derives a target steering angle based on the curvature of each point along the path, and sends the target steering angle onto the multiplex communication line 80. Detailed description of the guidance to the target parking position P is omitted as it does not constitute the core of the subject matter of the present invention.

Second Embodiment

[Outline]

Hereafter, a parking assist apparatus 2 according to a second embodiment of the present invention is described. Because the second embodiment is similar to the first embodiment in terms of [Configuration], [Initial setting of target parking position], and [Guidance to target parking position] described with reference to FIGS. 1 through 3, description of these points of the present invention is omitted. Thus, the following description is only concerned with the difference, i.e., [Guidance to initial position].

[Guidance to Initial Position]

Once the target parking position P is initially set, the vehicle moves forward and reaches the point G near the target parking position when guidance to the initial position I is started.

The manner of setting of the initial position I is similar to the first embodiment as described with reference to FIG. 4.

Figure 7A:
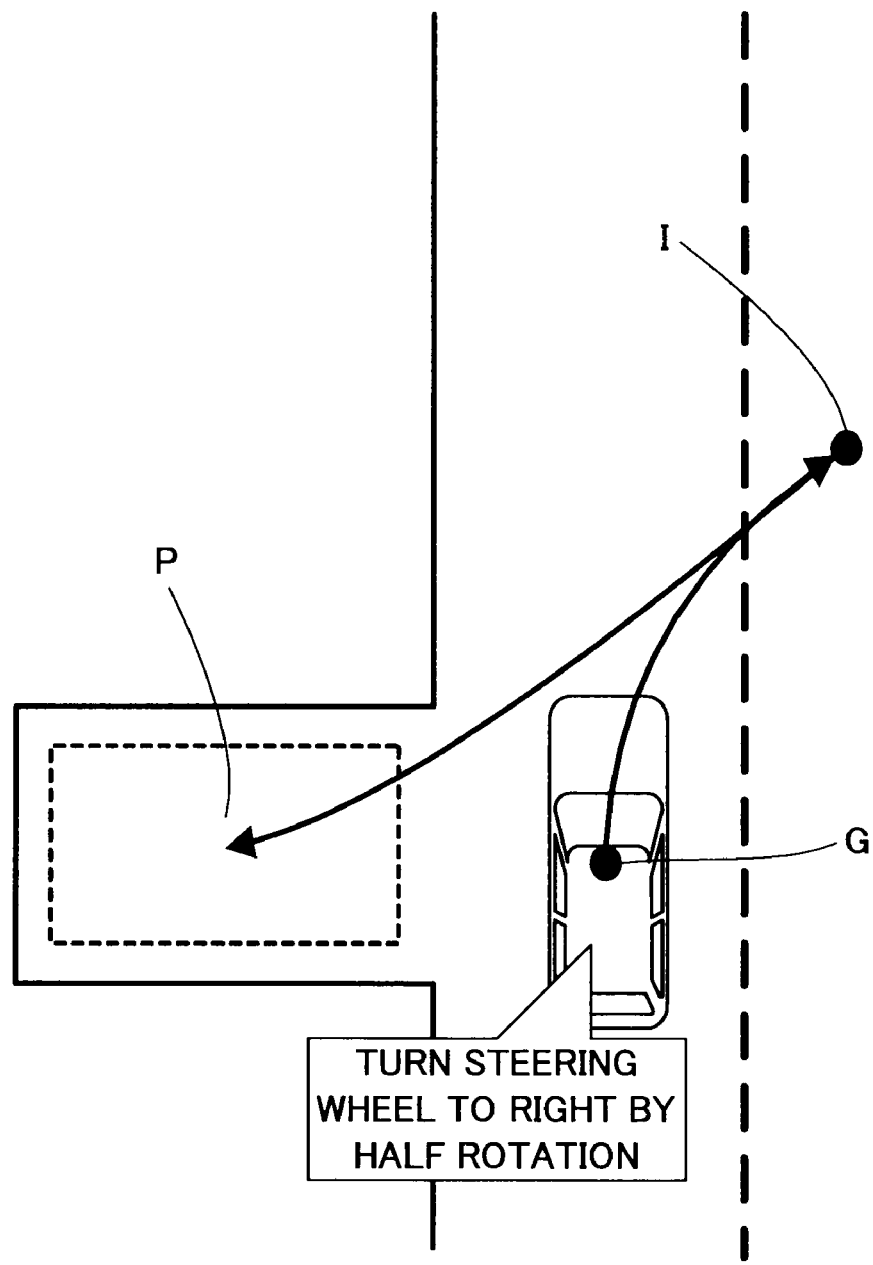
FIG. 7A illustrates how a voice instruction is given to a driver in order to realize a constant steering angle.

In accordance with the second embodiment, once the initial position I is determined, the vehicle is guided to move while basically a constant steering angle is maintained. In order to realize the constant steering angle, the driver is given a voice instruction by the voice input/output unit 25. The voice instruction may be in the form of a voice message to the effect that "Turn the steering wheel right by half rotation" (see FIG. 7A). In this way, the driver can easily move the vehicle to the initial position I. The method for outputting a required forward driving force may be the same as in the first embodiment.

However, an obstacle may exist along the path between the vehicle current position G and the initial position I. In such a case, the above basic voice instruction may lead to the vehicle hitting the obstacle or, less seriously, the driver feeling nervous.

Thus, in accordance with the second embodiment, whether the presence of an obstacle should be considered when the vehicle travels to the initial position I is determined more easily than according to the first embodiment, and the guidance is varied depending on the result of such determination. FIG. 8 shows a flowchart of an initial position guiding process performed by the parking assist ECU 70 according to the present embodiment, after the initial position I is determined. The guiding process is started upon initially setting the target parking position, as described above.

First, the parking assist ECU 70 determines whether an obstacle is detected by the radar unit 16 (S200). If no obstacle is detected by the radar unit 16, the initially generated message as mentioned above is outputted (S250).

If an obstacle is detected by the radar unit 16, the parking assist ECU 70 determines whether the obstacle is located on the opposite side to the target parking position P with respect to a direction of travel of the vehicle (along an axis of the vehicle) (S210).

If the obstacle is on the same side as the target parking position P with respect to the vehicle travel direction, the initially generated message as mentioned above is outputted (S250).

On the other hand, if the obstacle is on the opposite side to the target parking position P with respect to the vehicle travel direction, it is determined whether an initial position I# can be set by reducing the steering angle (S220). The initial position I# is set within the guidance enabled area, as in the case of the first embodiment. The initial position I# cannot be set if the steering angle required for traveling to the modified initial position I# exceeds the vehicle's limit steering angle, for example.

If it is determined that the initial position I# cannot be set, the driver is notified by the voice input/output unit 25 or the like, and the parking assist control is terminated (S240).

If it is determined that the initial position I# can be set, a steering angle for the vehicle to travel from its current position G to the initial position I# is derived and outputted via the voice input/output unit 25 via a message to the effect that "Turn the steering wheel right by a quarter rotation (S230).

Figure 7B:
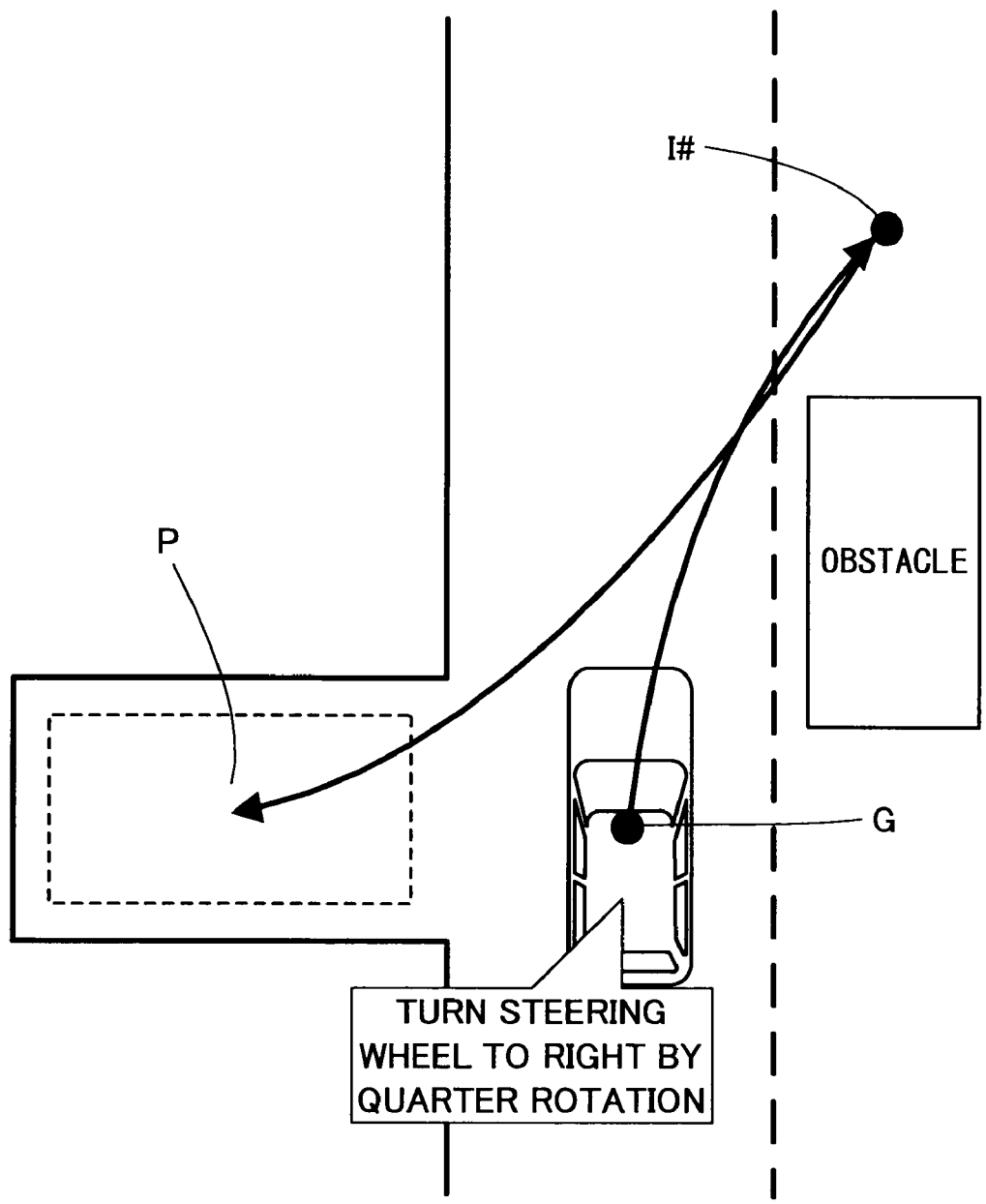
FIG. 7B illustrates how a voice instruction is given to a driver in order to realize a constant steering angle.

In this way, the vehicle can avoid the obstacle located at the opposite side to the target parking position P (see FIG. 7B). Thus, the probability of carrying through the parking assist control can be increased in a situation where an obstacle exists along the path between the current position of the vehicle and the initial position I.

Thus, in accordance with the above control, the vehicle can be appropriately guided to the initial position while taking into consideration an obstacle that may exist along the path from the vehicle current position to the initial position.

Although the guidance in the present embodiment is realized by a voice guidance, the guidance may involve automatic steering control or a display on the multi-display 20. Further, instead of issuing the voice guidance so that a constant steering angle can be maintained, instructions regarding steering operations may be outputted several times over the course of the entire guidance. In this way, the vehicle can be guided to the initial position in a more flexible manner.

Third Embodiment

[Outline]

Hereafter, a parking assist apparatus 3 according to a third embodiment of the present invention is described. The third embodiment is similar to the first embodiment in terms of [Configuration], [Initial setting of target parking position], and [Guidance to target parking position] described with reference to FIGS. 1 through 3, and description of these points of the present invention is omitted. The following description, therefore, involves only the difference, which is in [Guidance to initial position].

[Guidance to Initial Position]

Once the target parking position P is initially set, the vehicle moves forward and reaches the point G near the target parking position when guidance to the initial position I is started.

The manner of setting of the initial position I may be the same as in the first embodiment described above with reference to FIG. 4.

In accordance with the present embodiment, guidance to the initial position I may be given in any manner. The method for outputting a required forward driving force may be the same as in the first embodiment.

FIG. 9 shows a flowchart of an initial position guiding process performed by the parking assist ECU 70 according to the present embodiment after the initial position I has been determined. The guiding process is started upon initially setting the target parking position, as mentioned above.

First, the parking assist ECU 70 determines whether an obstacle is detected by the radar unit 16 (S300). If no obstacle is detected by the radar unit 16, the parking assist ECU 70 provides guidance to the initial position I (S330).

If an obstacle is detected by the radar unit 16, the parking assist ECU 70 determines whether the obstacle is located on the opposite side to the target parking position P with respect to the vehicle travel direction (along a vehicle axis) (S310).

If the obstacle is located on the same side as the target parking position P with respect to the vehicle travel direction, the parking assist ECU 70 provides guidance to the initial position I (S330).

On the other hand, if the obstacle is located on the opposite side to the target parking position P with respect to the vehicle travel direction, the driver is notified via the voice input/output unit 25 or the like that the parking assist control is to cease, and the parking assist control is terminated (S320).

In this way, the probability of inconveniences, such as the vehicle hitting the obstacle during an automatic control, can be reduced.

According to the above control, the vehicle can be appropriately guided to the initial position while taking into consideration any obstacle that may exist along the path from the vehicle current position to the initial position.

Although this invention has been described in detail with reference to certain embodiments, variations and modifications exist within the scope and spirit of the invention as described and defined in the following claims.

The present application is based on the Japanese Priority Application No. 2007-059060 filed Mar. 8, 2007, the entire contents of which are hereby incorporated by reference.

The invention claimed is:

1. A parking assist apparatus for guiding a vehicle to a target parking position, the apparatus comprising:
   an initial position guiding unit configured to guide at a predetermined timing the vehicle to an initial position where vehicle guidance to the target parking position is started; and
   an obstacle detecting unit configured to detect an obstacle around the vehicle,
   wherein the initial position guiding unit varies a steering angle for guiding the vehicle depending on whether the obstacle detected by the obstacle detecting unit is located on an opposite side to the target parking position with respect to a direction of travel of the vehicle,
   wherein, when the obstacle is located on the opposite side to the target parking position with respect to the direction of travel of the vehicle, the initial position guiding unit guides the vehicle to the initial position with a smaller steering angle than when the obstacle is not located on the opposite side to the target parking position with respect to the direction of travel of the vehicle.

2. The parking assist apparatus according to claim 1, wherein, when the obstacle is located on the opposite side to the target parking position with respect to the direction of travel of the vehicle, the initial position guiding unit determines whether the vehicle can travel to the initial position without hitting the obstacle detected by the obstacle detecting unit,
   wherein the initial position guiding unit guides the vehicle to the initial position when it determines that the vehicle can travel to the initial position without hitting the obstacle detected by the obstacle detecting unit.

3. A parking assist apparatus for guiding a vehicle to a target parking position, comprising:
   an initial position guiding unit configured to guide the vehicle at a predetermined timing to an initial position where vehicle guidance to the target parking position is started, the initial position being different from the parking position; and
   an obstacle detecting unit configured to detect an obstacle around the vehicle,
   wherein the initial position guiding unit guides the vehicle to the initial position when the obstacle detected by the obstacle detecting unit is not located on an opposite side to the target parking position with respect to a direction of travel of the vehicle.

4. The parking assisting apparatus according to claim 1, wherein the initial position and the initial position guiding path are modified only when the obstacle detected by the obstacle detecting unit is located on an opposite side to the target parking position with respect to a direction of travel of the vehicle.

5. The parking assisting apparatus according to claim 3, wherein the initial position guiding unit guides the vehicle to the initial position such that the vehicle can move to the initial position while a constant steering angle is maintained.

6. A parking assist apparatus for guiding a vehicle to a target parking position, the apparatus comprising:
   an initial position guiding unit configured to guide at a predetermined timing the vehicle to an initial position where vehicle guidance to the target parking position is started; and
   an obstacle detecting unit configured to detect an obstacle around the vehicle,
   wherein, when the obstacle detecting unit detects the obstacle located on an opposite side to the target parking position with respect to a direction of travel of the vehicle, the initial position guiding unit guides the vehicle to the initial position with a smaller steering angle than when the obstacle detecting unit does not detect the obstacle located on an opposite side to the target parking position with respect to a direction of travel of the vehicle.

7. The parking assisting apparatus according to claim 6, wherein the initial position guiding unit guides the vehicle to the initial position such that the vehicle can move to the initial position while a constant steering angle is maintained.

* * * * *